B. WISZNIEWSKA.
WAFFLE IRON.
APPLICATION FILED APR. 17, 1917.
1,238,974.
Patented Sept. 4, 1917.
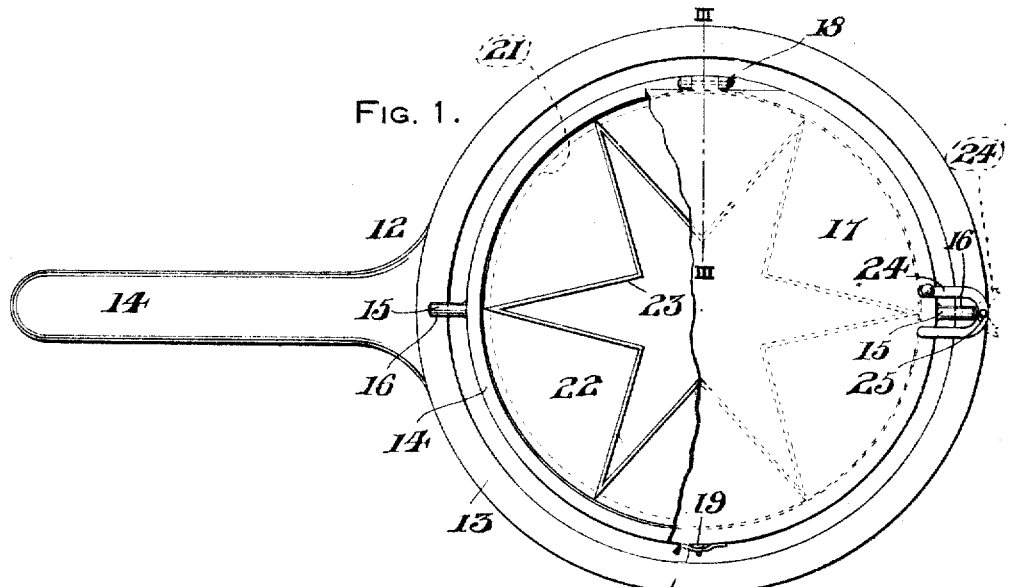
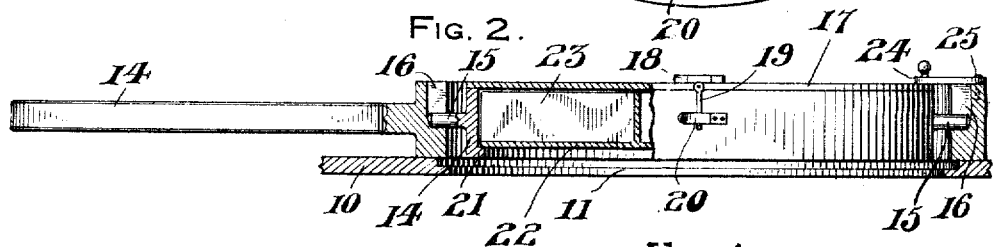
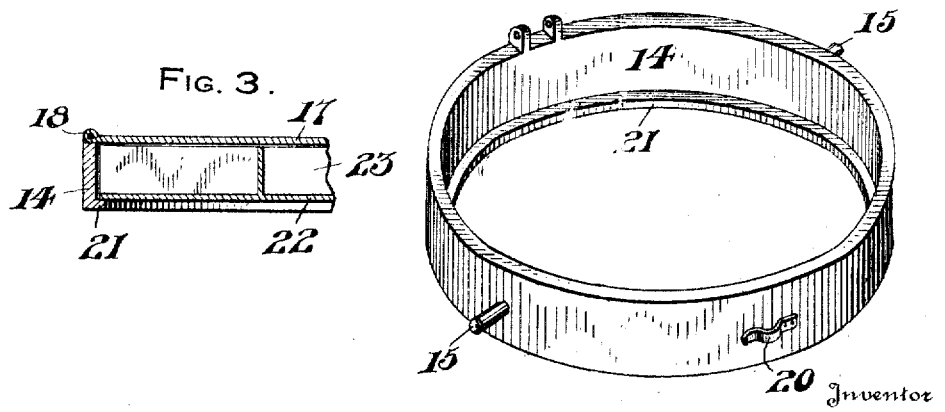
Inventor
B. Wiszniewska
By
Attorney

UNITED STATES PATENT OFFICE.

BRONISLAWA WISZNIEWSKA, OF SAULT STE. MARIE, MICHIGAN.

WAFFLE-IRON.

1,238,974.  Specification of Letters Patent.  Patented Sept. 4, 1917.

Application filed April 17, 1917. Serial No. 162,598.

*To all whom it may concern:*

Be it known that I, BRONISLAWA WISZ-NIEWSKA, a subject of Russia Poland, residing at Sault Ste. Marie, in the county of Chippewa and State of Michigan, have invented certain new and useful Improvements in Waffle-Irons, of which the following is a specification.

This invention relates to certain new and useful improvements in waffle irons.

The primary object of the invention is the provision of a cooking device in the nature of a griddle for cooking or baking waffles or similar eatables in a rapid manner, the device being easily operable for the perfect baking of the articles.

A further object of the device is the provision of a griddle form of cooker serviceable in turning the article to be cooked by revolving a portion of the device, the article being suitably retained during the cooking operation and readily removed when desired.

With these general objects in view and others that will appear as the nature of the invention is better understood, the same consists in the novel construction, combination and arrangement of parts hereinafter fully described, illustrated in the accompanying drawing and pointed out in the appended claims.

In the drawing forming a part of this application and in which like numerals refer to corresponding parts throughout the several views, Figure 1 is a top plan view of the device with the lid partially broken away.

Fig. 2 is a side elevation of the same partially broken away operatively positioned upon a stove top, the latter being illustrated in vertical section.

Fig. 3 is a radial sectional view taken upon line III—III of Fig. 1, and,

Fig. 4 is a perspective view of the pan ring employed with the device detached.

Referring more in detail to the drawing, it will be understood that the device is employable for cooking waffles or cakes by means of any suitable source of heat supplied such as a stove 10 provided with a circular lid opening 11 in the top thereof and over which the present device broadly assumed to be the shape of a griddle 12 is readily positioned and removed at will.

The griddle 12 comprises an annulus 13 and a handle 14 while a receiving pan having a side ring 14 is journaled in the annulus 13 by means of diametrically opposite trunnions 15 projecting from the said ring removably seated within sockets 16 in the said annulus.

The ring 14 is provided with a lid 17 hinged thereto at one side as at 18 and adapted to be secured in closed relation upon the ring by means of a swinging latch or hook 19 positionable beneath a spring 20 when desired. An inwardly projecting annular flange 21 is provided within the ring 14 and upon which a flange receiving form or mold 22 is adapted to be seated. The form 22 is herein illustrated as provided with a star-shaped frame 23 adapted to receive the dough therein, the dough being also arranged outwardly of the star between the points thereof.

It will be understood that with the mold 22 positioned within the ring 14 and filled with dough, the lid 17 may be closed and retained by the latch 19 whereupon the entire pan may be positioned within the annulus 13 to be readily turned when desired without removing the annulus from the stove 10. A U-shaped catch 24 is pivoted as at 25 to the annulus 13 adapted to overlie either the top or bottom of the pan when the latter is swung in radial alinement within the annulus 13, for instance as positioned upright in Fig. 3 of the drawing, it being understood that by releasing the catch 24 the pan may be readily inverted through the stove top opening 11 without shifting the annulus 13 the pan being retained inverted for applying heat to the lid 17 by readjusting the catch 24.

When the waffles or cakes are sufficiently cooked the entire pan may be removed from the annulus 13, and the lid 17 opened to remove the form 22 therefrom so that the waffles of substantially segmental shape may be removed, as well as the central star-shaped waffle. A serviceable cooking device is arranged which is readily operable in quickly cooking articles of food in any desirable molded formation while the parts of the device are easily separated not only for convenience in removing the cooked articles therefrom but also for the purpose of cleaning the device.

What I claim as new is:—

1. A cooking utensil comprising an annulus provided with sockets in its inner circumference opening upwardly upon its upper side, a ring having diametrically projecting trunnions removably journaled in the said sockets, a handle radially projecting from the said annulus outwardly of one of the said sockets, an inwardly projecting flange at the inner bottom edge of the said ring, a dough receiving frame arranged within the ring removably seated upon the said flange, a hinged retaining lid upon the side of said ring opposite the said flange and a retaining catch pivoted to the said annulus.

2. A cooking utensil, including a handled annulus having in its upper inner circumferential surface opposed sockets, a ring having upon its inner circumferential bottom edge a circular flange, said ring having opposed projecting trunnions received within the sockets of said annulus, fastening means between said ring and said annulus, and a dough-receiving receptacle with its bottom edge adapted to rest upon the inner bottom edge flange of said ring, said dough-receiving receptacle being provided with a central chamber and a plurality of supplemental chambers surrounding the aforesaid chamber, the bottom of said dough-receiving receptacle being common to both the central chamber and the plurality of supplemental chambers of said dough-receiving receptacle.

In testimony whereof I affix my signature.

BRONISLAWA WISZNIEWSKA.